_#_ United States Patent [19]

Ikeda

[11] Patent Number: 5,950,204
[45] Date of Patent: Sep. 7, 1999

[54] DETERMINING APPARATUS AND DETERMINING METHOD FOR INCLUSION RELATION BETWEEN SETS OF PARALLEL MULTIPLE LADDER-STRUCTURED DATA

[75] Inventor: Kenjiroh Ikeda, Tokyo, Japan

[73] Assignee: NEC Corporation, Tokyo, Japan

[21] Appl. No.: 08/788,692

[22] Filed: Jan. 24, 1997

[30] Foreign Application Priority Data

Jan. 24, 1996 [JP] Japan .................................... 8-029966

[51] Int. Cl.$^6$ ..................................................... G06F 17/30
[52] U.S. Cl. .......................... 707/102; 707/103; 395/683; 345/340; 345/346
[58] Field of Search .............................. 707/8, 100–103; 345/340–354, 339–346; 395/683

[56] References Cited

U.S. PATENT DOCUMENTS 5,604,851 2/1997 Taylor ....................................... 345/440
5,640,500 6/1997 Taylor ....................................... 345/440

Primary Examiner—Thomas G. Black
Assistant Examiner—Hosain T. Alam
Attorney, Agent, or Firm—Foley & Lardner

[57] ABSTRACT

An apparatus for determining whether or not a first set of parallel multiple ladder-structured data includes a second set of parallel multiple ladder-structured data, provided with: partial ordering relation extracting means for extracting any partial ordering relation with respect to every lateral bar in the second set of parallel multiple ladder-structured data; object lateral bar selecting means for selecting object lateral bars for which correspondence should be established on the basis of the extracted partial ordering relation; correspondence establishing means for establishing correspondence to lateral bars in the first set of parallel multiple ladder-structured data; and inclusion relation determining means for determining, on the basis of the result of processing to establish correspondence, whether or not the second set of parallel multiple ladder-structured data is included in the first set of parallel multiple ladder-structured data.

3 Claims, 3 Drawing Sheets

DATA 1
(INCLUDING SET OF DATA)

DATA 2
(INCLUDED SET OF DATA)

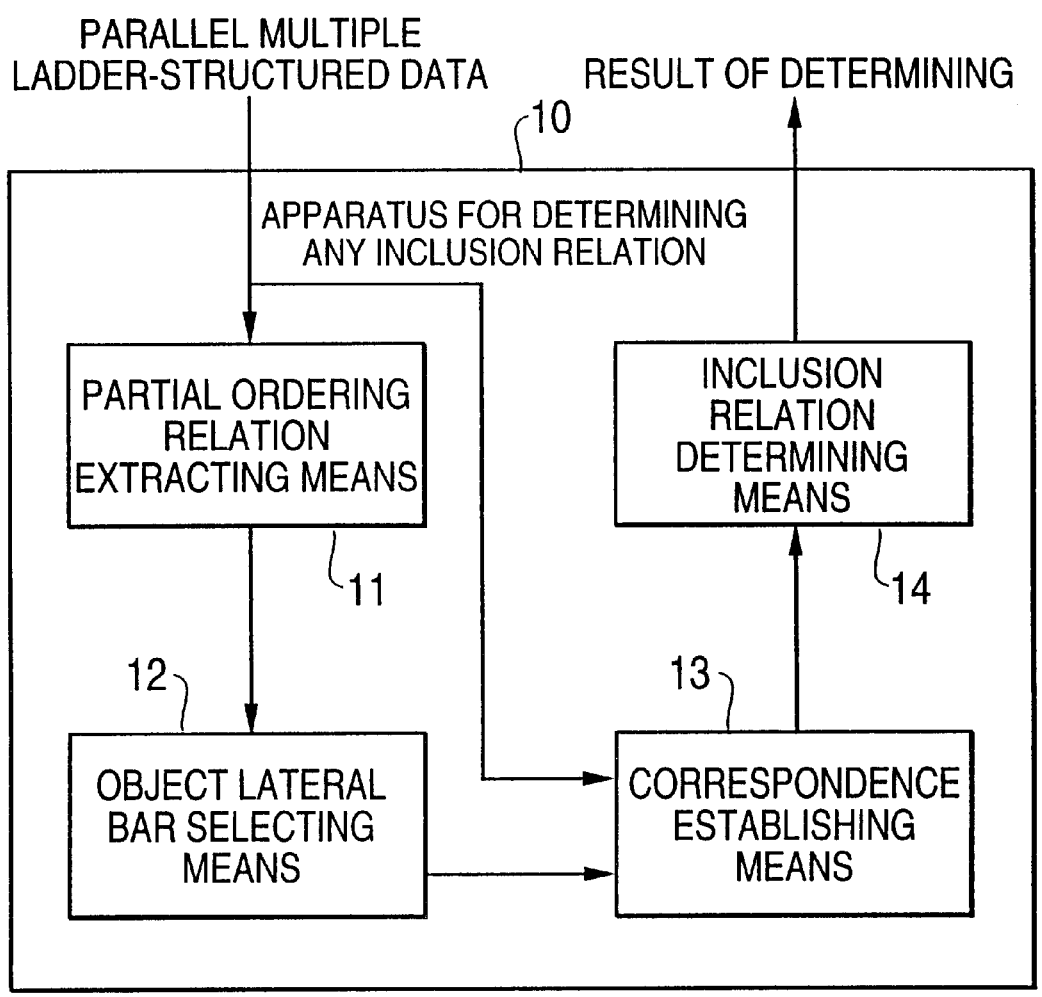

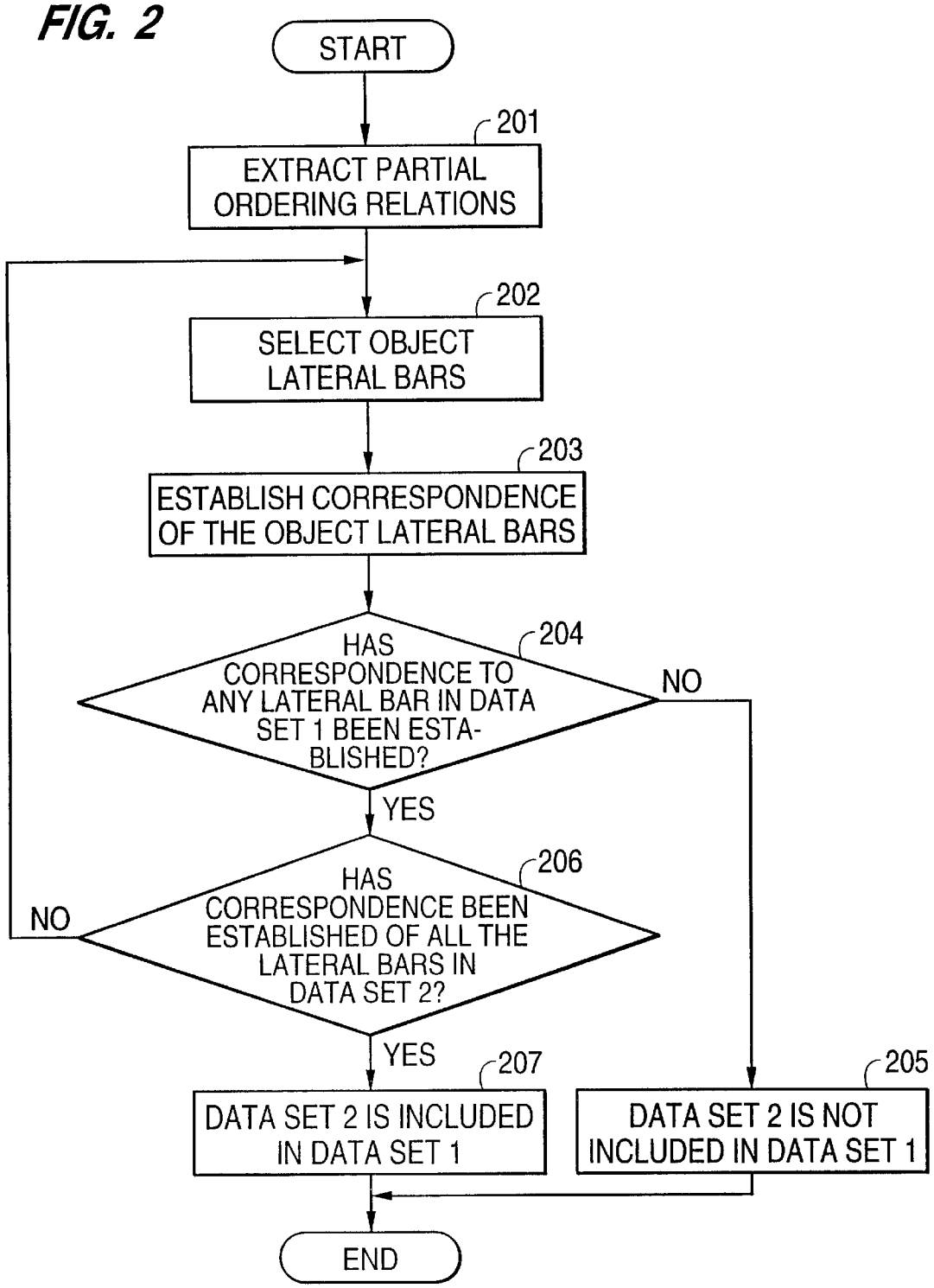

DATA 1
(INCLUDING SET OF DATA)

DATA 2
(INCLUDED SET OF DATA)

DETERMINING APPARATUS AND DETERMINING METHOD FOR INCLUSION RELATION BETWEEN SETS OF PARALLEL MULTIPLE LADDER-STRUCTURED DATA

BACKGROUND OF THE INVENTION

1. Field of the Invention

The present invention relates to an apparatus and a method for determining any inclusion relation between two sets of parallel multiple ladder-structured data. A set of parallel multiple ladder-structured data here means a set of data having a structure comprising a plurality of longitudinal bars and a plurality of lateral bars spanning the space between any two of these longitudinal bars.

2. Description of the Related Art

A message sequence diagram illustrating the exchange of messages between a plurality of subsystems and an event trace diagram showing the flows of events between a plurality of objects are examples of the aforementioned parallel multiple ladder-structured data consisting of a plurality of longitudinal bars and a plurality of lateral bars spanning the space between any two of these longitudinal bars.

Regarding any two sets of such parallel multiple ladder-structured data, it may have to be determined whether one set of parallel multiple ladder-structured data includes the other set. For instance, in checking whether or not prescribed messages are exchanged between a plurality of subsystems, it is necessary to detect only the noted messages out of the actual message sequence which also includes messages unrelated to the noted ones, and processing of this detection corresponds to the aforementioned determination of any inclusion relation between two sets of parallel multiple ladder-structured data.

To date, there has been no efficient method to check the presence or absence of any inclusion relation between two sets of parallel multiple ladder-structured data.

An object of the present invention is to improve the efficiency of determination of any inclusion relation between two sets of parallel multiple ladder-structured data.

More specifically, the object is to make it possible to efficiently detect, when it is to be checked whether or not prescribed messages are exchanged between a plurality of subsystems, only the noted messages out of the actual message sequence which also includes messages unrelated to the noted ones.

The object further is to make it possible to efficiently detect, when it is to be checked whether or not there are flows of prescribed events between a plurality of objects, only the noted events out of the actual event trace which also includes events unrelated to the noted ones.

SUMMARY OF THE INVENTION

According to a first aspect of the present invention, there is provided an apparatus for determining whether or not a first set of parallel multiple ladder-structured data includes a second set of parallel multiple ladder-structured data, comprising:

partial ordering relation extracting means for extracting any partial ordering relation indicating the order in which correspondence is established for every lateral bar in said second set of parallel multiple ladder-structured data;

object lateral bar selecting means for selecting object lateral bars for which correspondence should be established on the basis of the partial ordering relation of the lateral bars extracted by said partial ordering relation extracting means;

correspondence establishing means for establishing correspondence between each of the lateral bars selected by said object lateral bar selecting means and a lateral bar in said first set of parallel multiple ladder-structured data; and inclusion relation determining means for determining, on the basis of the result of processing to establish correspondence by said correspondence establishing means, whether or not said second set of parallel multiple ladder-structured data is included in said first set of parallel multiple ladder-structured data.

According to a second aspect of the present invention, there is provided a version of said first apparatus for determining any inclusion relation between two sets of parallel multiple ladder-structured data, wherein:

said partial ordering relation extracting means extracts any partial ordering relation by performing processing, for every lateral bar in said second set of parallel multiple ladder-structured data, to define that, prior to a certain lateral bar in said second set of parallel multiple ladder-structured data, correspondence should be established for any other lateral bar connected to either of the two longitudinal bars, to which said certain lateral bar is connected, and which is positioned higher than said certain lateral bar.

According to a third aspect of the present invention, there is provided a version of said second apparatus for determining any inclusion relation between two sets of parallel multiple ladder-structured data, wherein:

said object lateral bar selecting means selects, out of lateral bars in said second set of parallel multiple ladder-structured data for which no correspondence has been established as yet, at least one lateral bar having the highest priority in partial ordering relation.

According to a fourth aspect of the present invention, there is provided a version of said third apparatus for determining any inclusion relation between two sets of parallel multiple ladder-structured data, wherein:

said correspondence establishing means establishes correspondence of said object lateral bars, selected out of said second set of parallel multiple ladder-structured data, to lateral bars positioned lower than all the lateral bars which, out of the lateral bars of said first set of parallel multiple ladder-structured data, are between two longitudinal bars of said first set of parallel multiple ladder-structured data corresponding to the two longitudinal bars connected to said object lateral bars and already have established correspondence to lateral bars in said second set of parallel multiple ladder-structured data.

According to a fifth aspect of the present invention, there is provided a version of said fourth apparatus for determining any inclusion relation between two sets of parallel multiple ladder-structured data, wherein:

said inclusion relation determining means determines that said second set of parallel multiple ladder-structured data is included in said first set of parallel multiple ladder-structured data when correspondence is established of every lateral bar in said second set of parallel multiple ladder-structured data to one or another of lateral bars in said first set of parallel multiple ladder-structured data.

According to a first aspect of the present invention, there is provided a method for determining whether or not a first set of parallel multiple ladder-structured data includes a second set of parallel multiple ladder-structured data, comprising the following procedure:

a partial ordering relation extracting step for extracting any partial ordering relation indicating the order in which correspondence is established for every lateral bar in said second set of parallel multiple ladder-structured data;

an object lateral bar selecting step for selecting object lateral bars for which correspondence should be established on the basis of the partial ordering relation of the lateral bars extracted at said partial ordering relation extracting step;

a correspondence establishing step for establishing correspondence between each of the lateral bars selected at said object lateral bar selecting step and a lateral bar in said first set of parallel multiple ladder-structured data; and an inclusion relation determining step for determining, on the basis of the result of processing to establish correspondence at said correspondence establishing step, whether or not said second set of parallel multiple ladder-structured data is included in said first set of parallel multiple ladder-structured data.

According to a second aspect of the present invention, there is provided a version of said first method for determining any inclusion relation between two sets of parallel multiple ladder-structured data, wherein:

at said partial ordering relation extracting step, any partial ordering relation is extracted by performing processing, for every lateral bar in said second set of parallel multiple ladder-structured data, correspondence should be established for any other lateral bar connected to either of the two longitudinal bars, to which said certain lateral bar is connected, and which is positioned higher than said certain lateral bar.

According to a third aspect of the present invention, there is provided a version of said second method for determining any inclusion relation between two sets of parallel multiple ladder-structured data, wherein:

at said object lateral bar selecting step, out of lateral bars in said second set of parallel multiple ladder-structured data for which no correspondence has been established as yet, at least one lateral bar having the highest priority in partial ordering relation is selected.

According to a fourth aspect of the present invention, there is provided a version of said third method for determining any inclusion relation between two sets of parallel multiple ladder-structured data, wherein:

at said correspondence establishing step, correspondence of said object lateral bars, selected out of said second set of parallel multiple ladder-structured data, is established to lateral bars positioned lower than all the lateral bars which, out of the lateral bars of said first set of parallel multiple ladder-structured data, are between two longitudinal bars of said first set of parallel multiple ladder-structured data corresponding to the two longitudinal bars connected to said object lateral bars and already have established correspondence to lateral bars in said second set of parallel multiple ladder-structured data.

According to a fifth aspect of the present invention, there is provided a version of said fourth method for determining any inclusion relation between two sets of parallel multiple ladder-structured data, wherein:

at said inclusion relation determining step, it is determined that said second set of parallel multiple ladder-structured data is included in said first set of parallel multiple ladder-structured data when correspondence is established of every lateral bar in said second set of parallel multiple ladder-structured data to one or another of lateral bars in said first set of parallel multiple ladder-structured data.

According to a first aspect of the present invention, there is provided a computer-readable memory medium for determining whether or not a first set of parallel multiple ladder-structured data includes a second set of parallel multiple ladder-structured data, comprising the following processings:

partial ordering relation extraction processing for extracting any partial ordering relation indicating the order in which correspondence is established for every lateral bar in said second set of parallel multiple ladder-structured data;

object lateral bar selection processing for selecting object lateral bars for which correspondence should be established on the basis of the partial ordering relation of the lateral bars extracted by said partial ordering relation extraction processing;

correspondence establishment processing for establishing correspondence between each of the lateral bars selected by said object bar selection processing and a lateral bar in said first set of parallel multiple ladder-structured data; and inclusion relation determination processing for determining, on the basis of the result of processing to establish correspondence by said correspondence establishment processing, whether or not said second set of parallel multiple ladder-structured data is included in said first set of parallel multiple ladder-structured data.

According to a second aspect of the present invention, there is provided a version of said first computer-readable memory medium for determining any inclusion relation between two sets of parallel multiple ladder-structured data, wherein:

by said partial ordering relation extraction processing, any partial ordering relation is extracted by performing processing, for every lateral bar in said second set of parallel multiple ladder-structured data, to define that, prior to a certain lateral bar in said second set of parallel multiple ladder-structured data, correspondence should be established for any other lateral bar connected to either of the two longitudinal bars, to which said certain lateral bar is connected, and which is positioned higher than said certain lateral bar.

According to a third aspect of the present invention, there is provided a version of said second computer-readable memory medium for determining any inclusion relation between two sets of parallel multiple ladder-structured data, wherein:

by said object lateral bar selection processing, out of lateral bars in said second set of parallel multiple ladder-structured data for which no correspondence has been established as yet, at least one lateral bar having the highest priority in partial ordering relation is selected.

According to a fourth aspect of the present invention, there is provided a version of said third computer-readable memory medium for determining any inclusion relation between two sets of parallel multiple ladder-structured data, wherein:

by said correspondence establishment processing, correspondence of said object lateral bars, selected out of said second set of parallel multiple ladder-structured data, is established to lateral bars positioned lower than all the lateral bars which, out of the lateral bars of said first set of parallel multiple ladder-structured data, are between two longitudinal bars of said first set of parallel multiple ladder-structured data corresponding to the two longitudinal bars connected to said object lateral bars and already have established correspondence to lateral bars in said second set of parallel multiple ladder-structured data.

According to a fifth aspect of the present invention, there is provided a version of said fourth computer-readable memory medium for determining any inclusion relation between two sets of parallel multiple ladder-structured data, wherein:

by said inclusion relation determination processing, it is determined that said second set of parallel multiple ladder-structured data is included in said first set of parallel multiple ladder-structured data when correspondence is established of every lateral bar in said second set of parallel multiple ladder-structured data to one or another of lateral bars in said first set of parallel multiple ladder-structured data.

BRIEF DESCRIPTION OF THE DRAWINGS

Other features and advantages of the present invention will be more apparent from the following detailed description when taken in conjunction with the accompanying drawings, in which:

FIG. 1 is a block diagram illustrating the configuration of an inclusion relation determining apparatus, which is a preferred embodiment of the invention;

FIG. 2 is a flow chart showing the operation of the preferred embodiment of the invention.

DETAILED DESCRIPTION OF THE PREFERRED EMBODIMENT

Figure 3A:
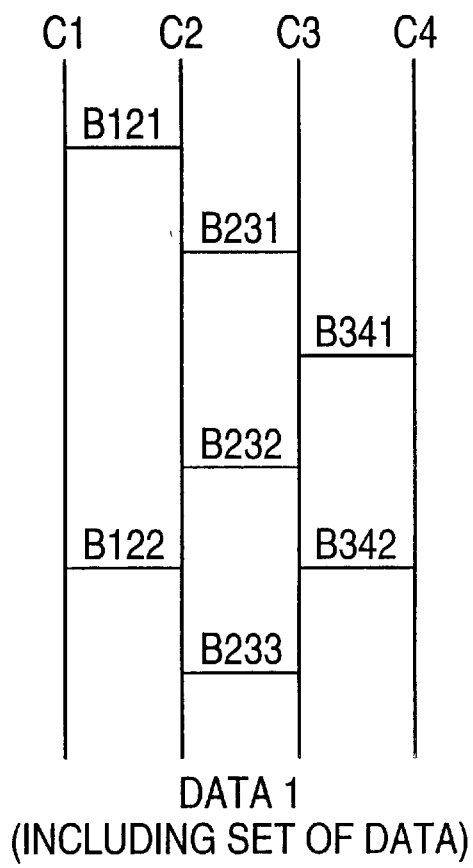
FIGS. 3(a)–(b) is a diagrams illustrating examples of sets of parallel multiple ladder-structured data between which the presence or absence of inclusion relation is to be determined.

A preferred embodiment of the present invention will be described in detail below with reference to drawings.

FIG. 1 is a block diagram illustrating the configuration of an inclusion relation determining apparatus for sets of parallel multiple ladder-structured data, which is a preferred embodiment of the invention.

Referring to FIG. 1, an inclusion relation determining apparatus 10, which is this preferred embodiment, is provided with a partial ordering relation extracting section 11 for extracting any partial ordering relation between sets of parallel multiple ladder-structured data; an object lateral bar selecting section 12 for selecting object lateral bars for which correspondence should be established; a correspondence establishing section 13 for establishing correspondence between lateral bars in two sets of parallel multiple ladder-structured data; and an inclusion relation determining section 14 for determining, on the basis of the result of processing to establish correspondence, any inclusion relation between the two sets of parallel multiple ladder-structured data. These processing sections are realized by a CPU and a program for controlling the operation of the CPU. This program is provided as recorded in a memory medium such as a semiconductor memory or a magnetic disk.

The partial ordering relation extracting section 11, to which sets of parallel multiple ladder-structured data are entered, extracts any partial ordering relation between them. The partial ordering relation here means an ordering relation determined, between a lateral bar and another lateral bar connected to either of the two longitudinal bars to which the first lateral bar is connected, on the basis of the vertical relation between their connecting points. The partial ordering relation defines that a lateral bar whose connecting point is higher should have correspondence established before another whose connecting point is lower. The sequence in which all the lateral bars in an included set of data have correspondence established is determined according to this partial ordering relation. This sequence corresponds to the order, when a set of parallel multiple ladder-structured data is to be traced from the top to the bottom, of lateral bars which are passed. Therefore, a series of sequential positions are not assigned to all the lateral bars, but the absence of priority of posteriority is possible between a specific lateral bar and another specific lateral bar.

The object lateral bar selecting section 12 selects, out of lateral bars of the included set of data from which any partial ordering relation has been extracted by the partial ordering relation extracting section 11, a lateral bar or bars of which correspondence to a lateral bar or bars in the including set of data should be established (an object lateral bar or bars). The object lateral bars to be selected here are, out of lateral bars in the included set of data for which no correspondence has been established at yet, all the lateral bars having the highest priority in partial ordering relation. In other words, for all the lateral bars for which correspondence should be established earlier than the lateral bars to be selected, correspondence should be established before that. Incidentally, in a partial ordering relation, whereas there may be, to a specific lateral bar, another specific lateral bar whose priority or posteriority cannot be defined as stated above, in this case all the plurality of lateral bars are made object lateral bars, and all the object lateral bars are subjected to the processing of correspondence establishment by the next correspondence establishing section 13. Or else, object lateral bars may be selected in accordance with any rule, and correspondence established for them successively.

The correspondence establishing section 13 establishes correspondence of object lateral bars, selected by the object lateral bar selecting section 12 out of the included set of data, to lateral bars in the including set of data. Here, which lateral bar should be made to correspond to which lateral bar in the including set of data is determined by the following procedure.

First, two longitudinal bars corresponding to the two longitudinal bars to which the object lateral bars selected by the object lateral bar selection section 12 out of the included set of data are selected out of the longitudinal bars of the including set of data. Which longitudinal bar in the including set of data should be made correspond to which longitudinal bar in the included set of data, though limited to some extent by the type of event represented by the set of parallel multiple ladder-structured data which is the object of processing, can be determined in advance in accordance with any rule.

Then, correspondence is established of lateral bars which, out of lateral bars in the including set of data, are connected to the pertinent two longitudinal bars and positioned lower than all the lateral bars of which correspondence to lateral bars in the included set of data is already established, to object lateral bars in the included set of data.

The inclusion determining section 14 determines, when correspondence is established of every lateral bar in the included set of data to one or another of lateral bars in the including set of data by the object lateral bar selecting section 12 and the corresponding establishing section 13, that the included set of data is included in the including set of data.

Next will be described the flow of processing in this embodiment of the invention with reference to the flow chart of FIG. 2 and to FIG. 3.

Figure 3B:
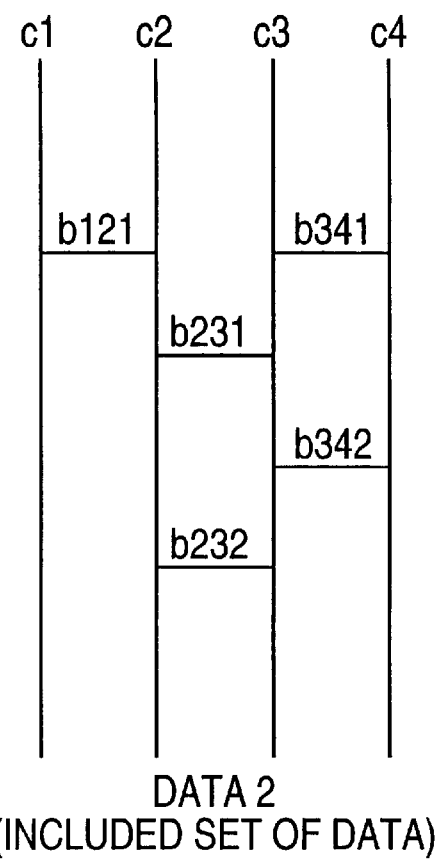

FIG. 3 is a diagram illustrating examples of sets of parallel multiple ladder-structured data between which the presence or absence of inclusion relation is to be determined.

As indicated, data set 1 is the including data, and data set 2 is the included data. In data set 1, the ith longitudinal bar is represented by Ci, the jth longitudinal bar by Cj and, out of the lateral bars connecting Ci and Cj, the kth from the top by Bijk. Bijk and Bjik denote the same lateral bar. Similarly in data set 2, the ith longitudinal bar is represented by ci, the jth longitudinal bar by cd and, out of the lateral bars connecting ci and cj, the kth from the top by bijk. In the diagram, correspondence is established in advance of longitudinal bars C1, C2, C3 and C4 in data set 1 to longitudinal bars c1, c2, c3 and c4, respectively, in data set 2.

First the partial ordering relation extracting section 11 extracts partial ordering relations with respect to all the lateral bars b121, b231, b232, b341 and b342 in data set 2, which is the included set of data (step 201).

To take note of longitudinal bars c1 and c2 with reference to FIG. 3, as there is no lateral bar connected to either longitudinal bar c1 or c2 and positioned higher than lateral bar b121, there is no lateral bar for which correspondence is to be established before lateral bar 121. To take note of longitudinal bars c2 and c3, as lateral bars b121 and b341 are connected to longitudinal bar c2 or c3 and positioned higher than lateral bar b231, those for which correspondence is to be established before lateral bar c231 are lateral bars b121 and b341. To take note of longitudinal bars c3 and c4, as there is no lateral bar connected to either longitudinal bar c3 or c4 and positioned higher than lateral bar b341, there is no lateral bar for which correspondence is to be established before lateral bar b341. At this point of time, there is extracted a partial ordering relation that lateral b121 precedes lateral bar b231 and lateral bar b341 precedes lateral bar b231.

Thereafter, for each lateral bar, the lateral bar or bars for which correspondence should be established earlier are specified similarly. As a result, there is extracted a partial ordering relation that lateral bar b231 precedes lateral bar b342 and lateral bar b342 precedes lateral b232.

Then, the object lateral bar selecting section 12 selects, out of all the lateral bars of data set 2 for which partial ordering relations have been extracted, object lateral bars for which correspondence should be established (step 202).

Referring to FIG. 3, when a first object lateral bar is to be selected, since there is no lateral bar for which correspondence has been established, lateral bars b121 and b341 are selected as object lateral bars prior to which correspondence needs to be established for no other lateral bar.

Next, the correspondence establishing section 13 establishes correspondence of the object lateral bars selected by the object lateral bar selecting section 12 to lateral bars in the included set of data (step 203).

The longitudinal bars in data set 1 corresponding to longitudinal bars c1 and c2, to which object lateral bar b121 is connected, are C1 and C2. At this point of time, of none out of the lateral bars connected to longitudinal bar C1 or C2, correspondence is established to any lateral bar in data set 2. Therefore, correspondence is established of lateral bar B121, positioned at the top among the lateral bars between longitudinal bars C1 and C2, to object lateral bar b121.

On the other hand, the longitudinal bars in data set 1 corresponding to longitudinal bars c3 and c4, to which object lateral bar b341 is connected, are C3 and C4. At this point of time, of none out of the lateral bars connected to longitudinal bar C3 or C4, correspondence is established to any lateral bar in data set 2. Therefore, correspondence is established of lateral bar B341, positioned at the top among the lateral bars between longitudinal bars C3 and C4, to object lateral bar b341.

Next, the correspondence establishing section 13 determines, with respect to all the object lateral bars selected by the object lateral bar selecting section 12, whether or not correspondence to any lateral bar in data set 1 has been established (step 204) and, if not, the inclusion relation determining section 14 will judge that data set 2 is not included in data set 1 (step 205).

Since, in this instance, correspondence has been established of object lateral bars b121 and b341, selected by the object lateral bar selecting section 12, to lateral bars in data set 1, the inclusion relation determining section 14 does not judge that data set 2 is not included in data set 1.

And, as correspondence has not yet been established of all the lateral bars in data set 2, the process returns to step 202 (step 206).

Referring to FIG. 3, since correspondence has already been established of lateral bars b121 and b341, the object lateral bar selecting section 12 selects the lateral bar next to them in the partial ordering relation, i.e. lateral bar b231, as object lateral bar (step 202).

The longitudinal bars in data set 1 corresponding to longitudinal bars c2 and c3, to which object lateral bar b231 is connected, are C2 and C3. Here, since the lateral bars, out of the lateral bars connected to longitudinal bar C2 or C3, for which correspondence is established are lateral bars B121 and B341, the correspondence establishing section 13 establishes correspondence of lateral bar B232, positioned lower than lateral bars B121 and B341 and at the top among the lateral bars between longitudinal bars C2 and C3, to object lateral bar b231.

Next, the correspondence establishing section 13 determines, with respect to all the object lateral bars selected by the object lateral bar selection section 12, whether or not correspondence to any lateral bar in data set 1 has been established (step 204) and, if not, the inclusion relation determining section 14 will judge that data set 2 is not included in data set 1 (step 205).

Since, in this instance, correspondence has been established of object lateral bar b231, selected by the object lateral bar selecting section 12, to a lateral bar in data set 1, the inclusion relation determining section 14 does not judge that data set 2 is not included in data set 1.

And, as correspondence has not yet been established of all the lateral bars in data set 2, the process returns to step 202 (step 206).

Thereafter, correspondence is similarly established of lateral bar B342 in data set 1 to lateral bar b342 in data set 2 and lateral bar B233 in data set 1 to lateral bar b232 in data set 2 by selecting object lateral bars and establishing correspondence of them to lateral bars in data set 1. As correspondence has now been established of all the lateral bars in data set 2 to lateral bars in data set 1, the inclusion relation determining section 14 determines that data set 2 is included in data set 1 (step 207).

Thus ends the operation of the preferred embodiment of the present invention.

The invention is characteristic in that a partial ordering relation is extracted from the included set of data, and correspondence is established of lateral bars in the included set of data to lateral bars in the including set of data in accordance with this partial ordering relation.

Therefore, the invention makes it possible to improve the efficiency of determining the presence or absence of inclusion relation between sets of parallel multiple ladder-structured data.

For instance, when it is to be checked whether or not prescribed messages are exchanged between a plurality of subsystems, only the noted messages can be efficiently detected out of the actual message sequence which also includes messages unrelated to the noted ones.

Furthermore, when it is to be checked whether or not there are flows of prescribed events between a plurality of objects, only the noted events can be efficiently detected out of the actual event tract which also includes events unrelated to the noted ones.

Although the invention has been described in detail above with reference to a specific embodiment thereof, it will be appreciated by those skilled in the art that this embodiment has been provided solely for the purpose of illustration, but in no way to be regarded as limiting the invention. Instead, various modifications and substitutions of equivalent techniques will be readily apparent to those skilled in the art upon reading this specification, and such modifications and substitutions are to be regarded as falling within the true scope and spirit of the invention.

What is claimed is:

1. An apparatus for determining whether a first parallel multiple ladder-structured data includes a second parallel multiple ladder-structured data, said first and second parallel multiple ladder-structured data being represented in a first and second graphical form respectively, each of which comprises a plurality of longitudinal bars and a plurality of lateral bars spanning the space between respective adjacent two of said plurality of longitudinal bars, the apparatus comprising:

partial ordering relation extracting means for extracting, from said second parallel multiple ladder-structured data, partial ordering relation for all the lateral bars in the second graphical form, by defining that a first lateral bar precedes a second lateral bar when said first lateral bar is connected to a longitudinal bar connected to said second lateral bar and positioned higher than the second lateral bar in the second graphical form;

object lateral bar selecting means for selecting an object lateral bar from the lateral bars in the second graphical form, based on the partial ordering relation extracted by said partial ordering relation extracting means;

correspondence establishing means for establishing a correspondence between said object lateral bar and one of the lateral bars in the first graphical form, for which no correspondence has been established, and which spans a space between two longitudinal bars in the first graphical form corresponding to two longitudinal bars connected to said object lateral bar in the second graphical form; and inclusion relation determining means for determining that said first parallel multiple ladder-structured data includes said second parallel multiple ladder-structured data when said correspondence is established by said correspondence establishing means for all of the lateral bars in the second graphical form.

2. A method for determining whether a first parallel multiple ladder-structured data includes a second parallel multiple ladder-structured data, said first and second parallel multiple ladder-structured data being represented in a first and second graphical form respectively, each of which comprises a plurality of longitudinal bars and a plurality of lateral bars spanning the space between respective adjacent two of said plurality of longitudinal bars, the method comprising the steps of:

extracting, from said second parallel multiple ladder-structured data, partial ordering relation for all the lateral bars in the second graphical form, by defining that a first lateral bar precedes a second lateral bar when said first lateral bar is connected to a longitudinal bar connected to said second lateral bar and positioned higher than the second lateral bar in the second graphical form;

selecting an object lateral bar from the lateral bars in the second graphical form, based on the partial ordering relation extracted by said partial ordering relation extracting step;

establishing a correspondence between said object lateral bar and one of the lateral bars in the first graphical form, for which no correspondence has been established, and which spans a space between two longitudinal bars in the first graphical form corresponding to two longitudinal bars connected to said object lateral bar in the second graphical form; and determining that said first parallel multiple ladder-structured data includes said second parallel multiple ladder-structured data when said correspondence is established by said correspondence establishing step for all of the lateral bars in the second graphical form.

3. A computer-readable storage medium having recorded thereon a program executable in a computer, the program determining whether a first parallel multiple ladder-structured data includes a second parallel multiple ladder-structured data, said first and second parallel multiple ladder-structured data being represented in a first and second graphical form respectively, each of the first and second graphical forms comprises a plurality of longitudinal bars and a plurality of lateral bars spanning a space between a respective adjacent two of said plurality of longitudinal bars, said program including:

a first program code for extracting, from said second parallel multiple ladder-structured data, partial ordering relation for all the lateral bars in the second graphical form, by defining that a first lateral bar precedes a second lateral bar when said first lateral bar is connected to a longitudinal bar connected to said second lateral bar and positioned higher than the second lateral bar in the second graphical form;

a second program code for selecting an object lateral bar from the lateral bars in the second graphical form, based on the partial ordering relation extracted by said first program code;

a third program code for establishing a correspondence between said object lateral bar and one of the lateral bars in the first graphical form, for which no correspondence has been established, and which span a space between two longitudinal bars in the first graphical form corresponding to two longitudinal bars connected to said object lateral bar in the second graphical form; and a fourth program code for determining that said first parallel multiple ladder-structured data includes said second parallel multiple ladder-structured data when said correspondence is established by said third program code for all the lateral bars in the second graphical form.

* * * * *